(12) United States Patent
Baxansky

(10) Patent No.: US 8,218,061 B2
(45) Date of Patent: Jul. 10, 2012

(54) APPARATUS, METHOD, AND MANUFACTURE FOR ITERATIVE AUTO-FOCUS USING DEPTH-FROM-DEFOCUS

(75) Inventor: Artemy Baxansky, Nesher (IL)

(73) Assignee: CSR Technology Inc., San Jose, CA (US)

(*) Notice: Subject to any disclaimer, the term of this patent is extended or adjusted under 35 U.S.C. 154(b) by 707 days.

(21) Appl. No.: 12/409,416

(22) Filed: Mar. 23, 2009

(65) Prior Publication Data

US 2010/0053417 A1 Mar. 4, 2010

Related U.S. Application Data

(60) Provisional application No. 61/094,338, filed on Sep. 4, 2008, provisional application No. 61/101,897, filed on Oct. 1, 2008.

(51) Int. Cl.
*G03B 13/00* (2006.01)

(52) U.S. Cl. ........................................ 348/345
(58) Field of Classification Search ................... 348/345
See application file for complete search history.

(56) References Cited

U.S. PATENT DOCUMENTS

| | | |
|---|---|---|
| 4,804,831 A | 2/1989 | Baba et al. |
| 5,070,353 A | 12/1991 | Komiya et al. |
| 5,148,209 A | 9/1992 | Subbarao |
| 5,151,609 A | 9/1992 | Nakagawa et al. |
| 5,193,124 A | 3/1993 | Subbarao |
| 5,231,443 A | 7/1993 | Subbarao |
| 5,475,429 A | 12/1995 | Kodama et al. |
| 5,793,900 A | 8/1998 | Nourbakhsh et al. |
| 7,389,042 B2 | 6/2008 | Lin et al. |
| 2005/0218231 A1 | 10/2005 | Massieu |
| 2008/0075444 A1 | 3/2008 | Subbarao et al. |
| 2008/0095312 A1 | 4/2008 | Rodenburg et al. |
| 2008/0297648 A1* | 12/2008 | Furuki et al. .............. 348/345 |

FOREIGN PATENT DOCUMENTS

| | | |
|---|---|---|
| JP | 62284314 A | 12/1987 |
| JP | 63127217 A | 5/1988 |

OTHER PUBLICATIONS

Sewlochan, Ray. "Iterative Depth From Defocus (I-DFD) Algorithms." The University of British Columbia. Apr. 1995 <https://circle.ubc.ca/bitstream/2429/3716/1/ubc_1995-0270.pdf>. Last accessed Oct. 28, 2009.

(Continued)

*Primary Examiner* — Clayton E Laballe
*Assistant Examiner* — Dennis Hancock
(74) *Attorney, Agent, or Firm* — Frommer Lawrence & Haug LLP; John W. Branch

(57) ABSTRACT

A camera with auto-focusing performs multiple iterations in which the distance from the camera to an object is estimated for the purpose of auto-focusing the camera. Each estimate is made using depth-from-defocus with at least two images used to make the estimate. When the two images are taken, the camera parameters are different. For example, the focus position, aperture, or zoom may be different between the two images. In each subsequent iteration, the previous estimate of distance from the camera to the object is used so that the parameter varied (focus position or zoom) is closer to that corresponding to the estimated distance from the camera to the object, so that the estimated distance is closer to the actual distance in each iteration.

22 Claims, 7 Drawing Sheets

OTHER PUBLICATIONS

Pentland, A.; "A New Sense for Depth of Field;" IJCAI; pp. 988-994; 1985.

Gokstorp, M.; "Computing depth from out-of-focus blur using a local frequency representation;" Proceedings of International Conference on Pattern Recognition; vol. 1; pp. 153-158; 1994.

Watanabe, M., et al.; "Real-time computation of depth from defocus;" Proceedings of SPIE: Three-Dimensional and Unconventional Imaging for Industrial Inspection and Metrology; 2599: A-03; Nov. 1995.

Watanabe, M., et al.; "Rational filters for passive depth from defocus;" International Journal of Computer Vision; vol. 27; Issue 3; May 1998.

Subbarao, M., et al.; "Depth from defocus and rapid autofocusing: a practical approach;" In Proc. CVPR; pp. 773-776; 1992.

Subbarao, M., et al.;"Depth from defocus: a spatial domain approach", International Journal of Computer Vision; vol. 13; No. 3; pp. 271-294; Dec. 1994.

Xiong, Y., et al.; "Depth from Focusing and Defocusing;" Carnegie Mellon University; 28 pages; Mar. 1993.

Subbarao, M.; "Parallel Depth Recovery by Changing Camera Parameters;" Second International Conference on Computer Vision; Dec. 1988; pp. 149-155.

Nayar, S., et al.; "Real-time focus range sensor;" IEEE Transactions on Pattern Analysis and Machine Intelligence; vol. 18; No. 12; Dec. 1996.

Bove, Jr., V. M.; "Entropy-Based Depth from Focus," Journal of the Optical Society of America; pp. 561-566; Apr. 1993.

Ziou, D., et al.; "Depth from defocus estimation in spatial domain;" Computer Vision and Image Understanding; vol. 81; No. 2; pp. 143-165; Feb. 2001.

Asada, N. et al.; "Depth from blur by zooming;" Proc. Vision Interface; pp. 165-172; 2001.

International Search Report and Written Opinion for International Patent Application No. PCT/US2009/056002 mailed Nov. 17, 2009.

\* cited by examiner

US 8,218,061 B2

APPARATUS, METHOD, AND MANUFACTURE FOR ITERATIVE AUTO-FOCUS USING DEPTH-FROM-DEFOCUS

CROSS-REFERENCE TO RELATED APPLICATIONS

This application claims the benefit of U.S. Provisional Patent Application No. 61/094,338, filed on Sep. 4, 2008 and U.S. Provisional Patent Application No. 61/101,897 filed on Oct. 1, 2008, the benefit of the earlier filing date of which is hereby claimed under 35 U.S.C. §119(e) and which is further incorporated by reference.

FIELD OF THE INVENTION

The invention is related to image focusing, and in particular but not exclusively, to a method and device for automatic focus (auto-focus) using depth-from-defocus in point-and-shoot digital cameras.

BACKGROUND OF THE INVENTION

The standard auto-focusing methods currently used in point-and-shoot digital cameras are collectively called "depth from focus." In the depth-from-focus method, the whole range of focus positions is scanned (from infinity to the closest possible distance). At each focus position, an image is taken, and a metric quantifying the sharpness of the region in the image on which the camera is to be focused is calculated. The focus position having the highest sharpness metric is then used for acquiring the still image. Some kind of gradient operator is usually employed to define the sharpness metric.

The second class of auto-focus methods is collectively called "depth from defocus." Unlike depth-from-focus, depth-from-defocus is not used in digital cameras, but is used in academic applications, such as optical measurement instruments or astrophysics. Depth from defocus is a method that estimates the depth map of a scene from a set of two or more images of the scene taken from the same point of view. The images are obtained by varying the camera parameters (typically the focus position, the zoom position, and/or the aperture size/iris). The information about the distance to the object is contained in the blur quantification of the defocused images.

BRIEF DESCRIPTION OF THE DRAWINGS

Non-limiting and non-exhaustive embodiments of the present invention are described with reference to the following drawings, in which.

DETAILED DESCRIPTION

Figure 1A:
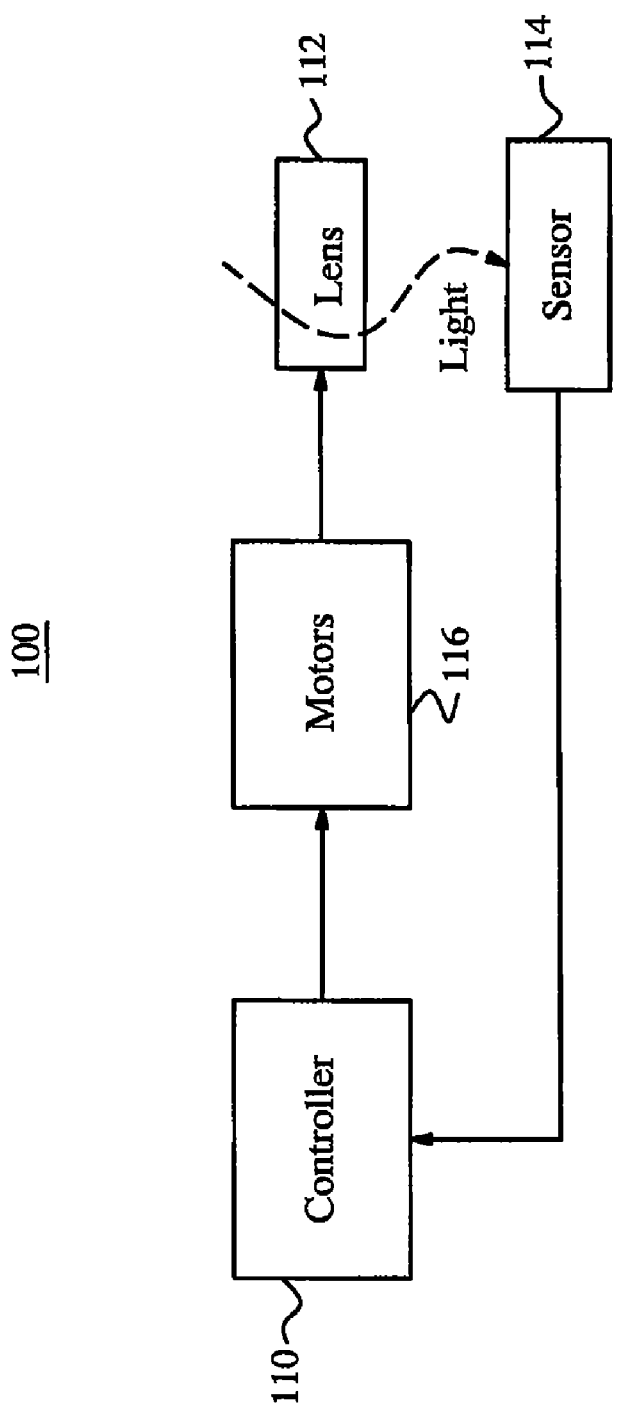
FIG. 1A shows a block diagram of an embodiment of a device with auto-focusing.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise.

Briefly stated, a camera performs multiple iterations of a calculation of an estimate of the distance from the camera to an object for auto-focusing. Each estimate is made using depth-from-defocus with at least two images used to make the estimate. When the two images are taken, the camera parameters are different. For example, the focus position, aperture, or zoom may be different between the two images. In each subsequent iteration, the previous estimate of distance from the camera to the object is used so that the parameter varied (focus position or zoom) is closer to that corresponding to the estimated distance from the camera to the object, so that the estimated distance is closer to the actual distance in each iteration.

As discussed above, one camera parameter (such as focus, zoom, or aperture), may be modified, while keeping the other parameters constant. In other embodiments, two or more parameters may be adjusted.

For example, in one embodiment two images are taken with the camera while the focus position v is at two different values, but all of the other parameters remain the same. A portion of the first image and the same portion of the second image are compared and used to estimate the distance from the camera to the object (u). The estimate of the distance u may be based on, for example, the blur widths measured in the two images. The focus position v relates to the distance u according to the lensmaker's equation $1/u+1/v=1/f$, where f represents the focal length, and f is fixed.

In the first iteration, in the embodiment under discussion, two arbitrary focus positions v1 and v2 are used for the two focus positions. In some embodiments, in order to avoid the situation when the estimation error in the first iteration is very high, the two focus positions should not be placed too close to each other or too close to the ends of the focus range. For example, in some embodiments, the first focus position v1 may be placed at the distance of one-third of the entire focus range from the focus position corresponding to the closest possible distance, while the second focus position v2 may be placed at the distance of one-third of the entire focus range from the focus position corresponding to infinity. After u is obtained, a maximum error Δu is also obtained based on, in one embodiment, estimates of the errors in the blur widths measured in the images. In the next iteration in this embodiment, the first position v1 is changed to the value corresponding to u−Δu (again, using the lensmaker's equation 1/u+1/v1=1/f to determine the value of v1 that corresponds to u−Δu), and second focus position is set to the focus position corresponding to u+Δu. In this embodiment, a comparison of the two images created at the new focus positions is made to calculate a final value for u, which is translated to the final focus value that auto-focuses the camera on the object. Additional iterations may be made if increased accuracy is needed.

FIG. 1A shows a block diagram of an embodiment of a device (100) with auto-focusing. In one embodiment, device 100 is a digital point-and-shoot camera. However, the invention is not so limited, and embodiments of the invention may be employed in other devices that require auto-focusing. Device 100 includes controller 110, lens 112, sensor 114, and motors 116.

Light enters device 100 through lens 112 and is received by sensor 114. In embodiments in which device 100 is a digital camera, sensor 114 may be a charged coupled device (CCD) sensor, a complementary metal oxide semiconductor (CMOS) sensor, or the like. Sensor 114 provides an image to controller 110.

Figure 1B:
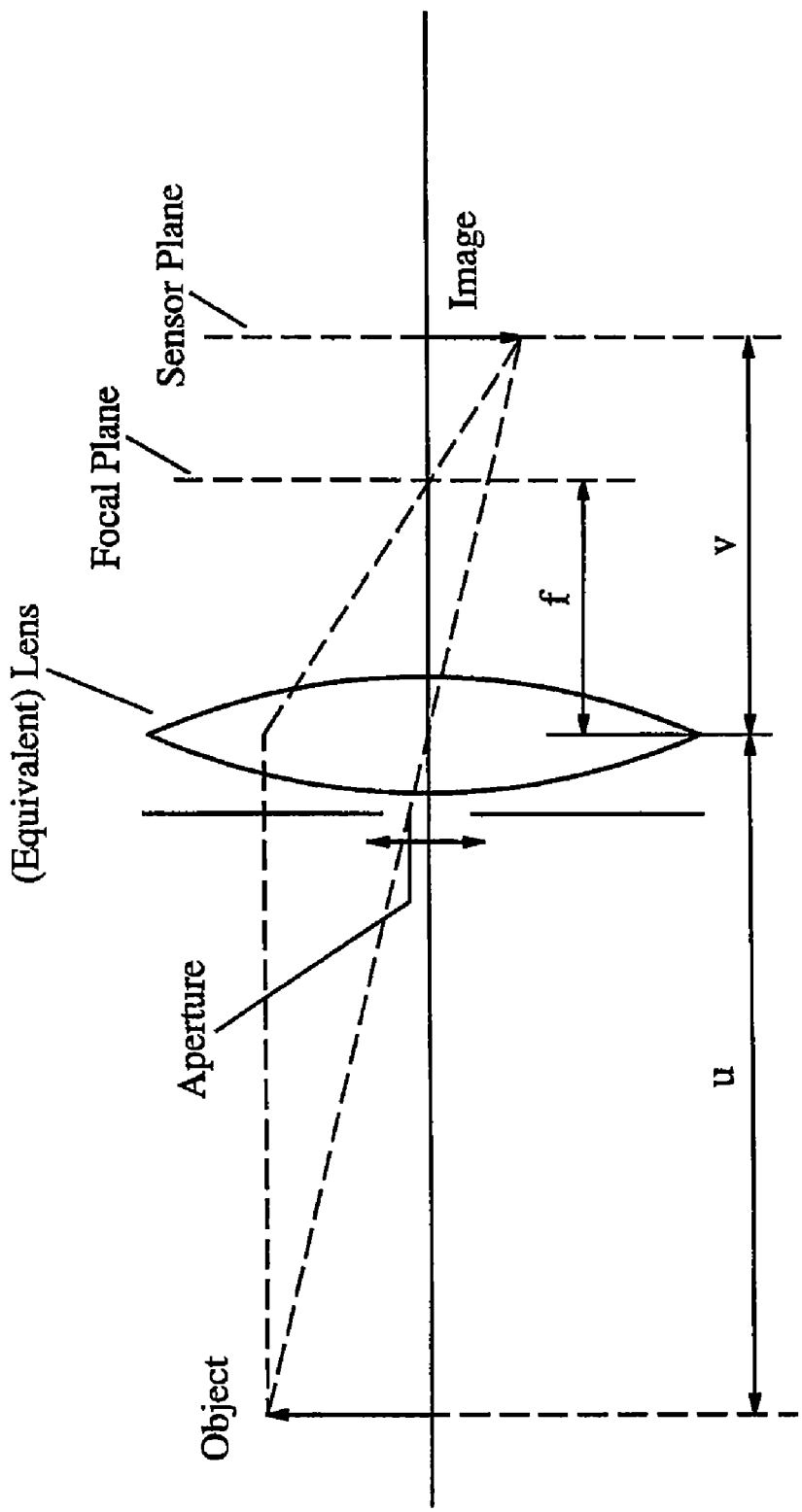
FIG. 1B shows an example of camera parameters that may be used for the device of FIG. 1A.

FIG. 1B shows an example of camera parameters that may be used for device 100. As shown, device 100 may be used to capture an image of an object, wherein the distance from the lens to the object is represented as u, the distance from the lens to the focal plane is represented as f, and the distance from the lens to the sensor is represented as v. Also illustrated in FIG. 1B is the aperture.

Controller 110 may provide various processing for the image received from sensor 114. For example, in some embodiments, controller 110 performs functions such as filtering, interpolation, anti-aliasing, and/or the like. Controller 110 also performs auto-focusing.

Figure 2:
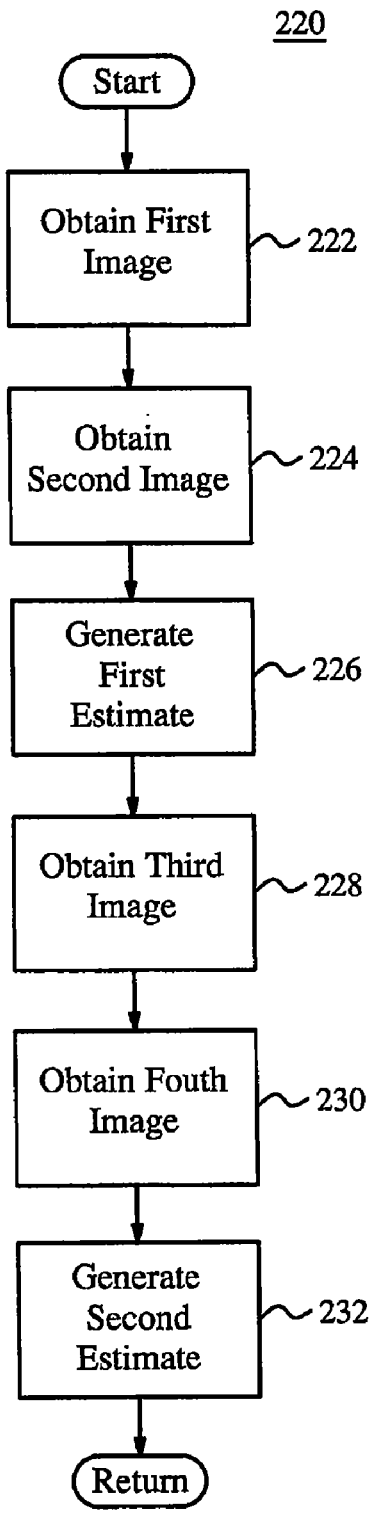
FIG. 2 illustrates a flow chart of an embodiment of a process of iterative auto-focusing.

In some embodiments, controller 110 includes a processor and a memory, wherein instructions from the memory are loaded into the processor to enable actions to be performed, such as the actions shown in the flow chart of the embodiment illustrated in FIG. 2. Although the algorithm(s) performed by controller 110 for auto-focusing may be performed in software, they may also be performed in hardware, or a combination of hardware, firmware, and/or software. Controller 110 controls motors 116. Motors 116 may include motors such as a focus motor and a zoom motor. By controlling motors 116 and the like, controller 110 can control such parameters as the aperture, zoom, and focus positions. For example, in some embodiments, controller 110 controls a focus motor in motors 116 to move lens 112 to change the focus position (v). In some embodiments, all three of these parameters are controlled during the auto focus process.

Controller 110 is configured to perform iterative auto-focusing. The iterative auto-focusing may be enabled by processor-readable code stored in an article of manufacture including a processor-readable memory in the controller, which enables the actions discussed below when executed by one or more processors. The memory may stored on RAM, ROM, a disc, or the like. In the iterative auto-focusing, two or more iterations of depth from defocus are used to determine the distance from the device 100 to the object from which the image is taken. In general, the closer the two or more images are to the in-focus image, the more accurate the estimation is. Depth from defocus is used to estimate the distance from the device 100 to the object in each iteration, in which each of the two or more images used in the iteration has one or more parameters varied, such as aperture, zoom, and focus position. For example, in one embodiment, the parameter varied is the focus position. After the first estimation, the lens is moved closer to or actually to the estimated position, and additional two (or more) images are acquired, from which a more accurate estimation of the actual location is calculated.

In one embodiment, controller 110 is configured to perform process 220, illustrated in FIG. 2.

FIG. 2 illustrates a flow chart of an embodiment of a process (220) of iterative auto-focusing. After a start block, process 220 proceeds to block 222, where a first image of an object is obtained employing a first set of camera parameters. The camera parameters may include focus position, zoom position, aperture, and/or the like.

The process then advances to block 224, where a second image of the object is obtained using a second set of camera parameters. The second set of parameters is not identical to the first set of parameters. In one embodiment, one of the parameters is changed while the other parameters remain the same. For example, in one embodiment, the second set of parameters is the same as the first set of parameters, except that the focus position is different.

The process then moves to block 226, where a first estimate of a distance from the camera to the object is generated from at least the first image and the second image using depth from defocus. Although not shown in FIG. 2, in some embodiments, more than two images may be used to generate the first estimate. Any suitable depth from defocus method may be used to generate the first estimate, including any depth from defocus method known in the prior art, or one of the new depth from defocus methods described herein may be employed to generate the second estimate.

The process then proceeds to block 228, where a third image of the object is obtained using a third set of camera parameters. The process then advances to block 230, where a fourth image of the object is obtained using a fourth set of camera parameters. The fourth set of parameters is not identical to the third set of parameters. In one embodiment, one of the parameters is changed while the other parameters remain the same. For example, in one embodiment, the fourth set of parameters is the same as the third set of parameters, except that the focus position is different.

The third and fourth sets of parameters are based, in apart, on the first estimate. In particular, the camera focus position may be changed to the two values equidistant from the value determined by the first estimate. As a result, they are selected to be closer to the position corresponding to the correct focus position so that, for the estimate of the distance from the camera to the object that is generated, it is closer to the actual focus position.

The process then moves to block 232, where a second estimate of a distance from the camera to the object is generated from at least the third image and the fourth image using depth from defocus. In some embodiments, more than two images may be used to generate the second estimate. Any suitable depth from defocus method may be used to generate the second estimate, including any depth from defocus method known in the prior art, or one of the new depth from defocus methods described herein may be employed to generate the second estimate.

After block 232, the process proceeds to the return block, where other processing is resumed. Although not shown in FIG. 2, in various embodiments, more then two estimates may be obtained. For example, in one embodiment, three estimates are obtained from a total of seven images, with the third estimate used as the final determined value of the distance from the camera to the object.

Figure 3:
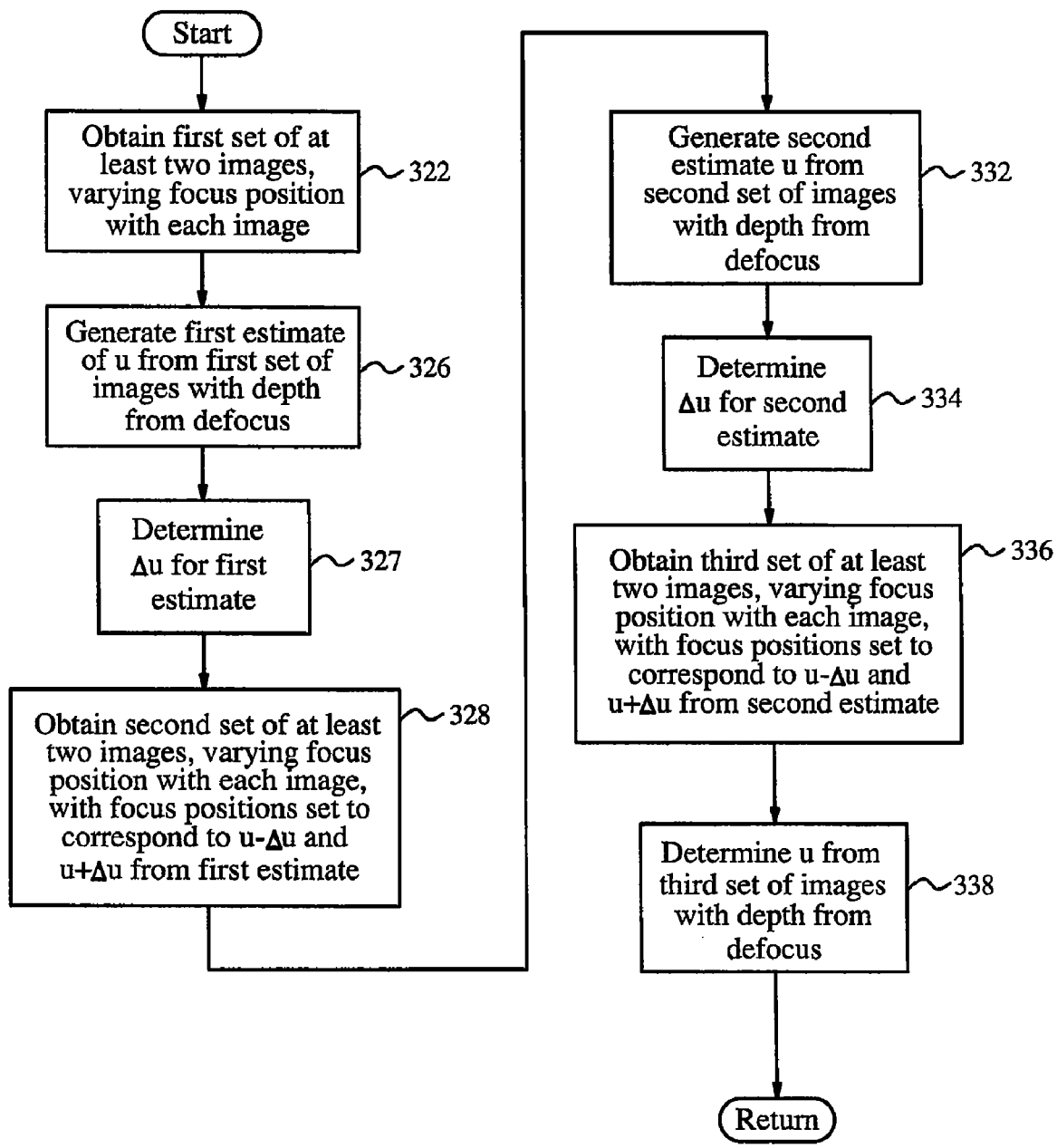
FIG. 3 shows a flow chart of a more detailed example of the embodiment of the process of FIG. 2.

FIG. 3 shows a flow chart of an embodiment of process 320, which is a version of the embodiment of the process 220 of FIG. 2 in which three iterations are conducted. After a start block, the process moves to block 322, where a first set of at least two images of an object are obtained. The images are the same, except for the focus position, which is different in each image. For the first set of images, the focus positions selected may be somewhat arbitrary.

The process then advances to block 326, where a first estimate of u (where u represents the distance from the camera to the object) is generated from the first set of images with a depth-from-defocus algorithm. Any suitable depth-from-defocus algorithm may be employed. For example, either of the depth-from-defocus algorithms shown in FIG. 4 or FIG. 5 may be employed. Alternatively, a depth-from-defocus algorithm known in the prior art may be employed.

The process then proceeds to block 327, where Δu, the maximum error of the estimation of u, is calculated. Examples of the calculation of Δu are described in greater detail below. The process then moves to block 328, where a second set of at least two images of the object are obtained. The images are the same, except for the focus position, which is different in each image. At block 328, the focus position used is the focus corresponding to u−Δu for the first image, and the focus corresponding to u+Δu for the second image. The u and Δu referred to are the ones calculated during the previous iteration at blocks 326 and 327. The focus position v relates to u according to the lensmaker's equation:

$$\frac{1}{u} + \frac{1}{v} = \frac{1}{f}$$

Accordingly, the focus position (v) corresponding to u−Δu based on the above equation is used for the first image, and the focus position (v) corresponding to u+Δu based on the above equation is used for the second image. If desired, these may be designated as u1 for the first estimate and Δu1 for the maximum error of the first estimate, to distinguish them from the subsequent estimates. The process then advances to block 332, where a second estimate of u (u2) is generated from the second set of images with a depth from defocus algorithm.

The process then proceeds to block 334, where Δu2 is calculated for the second estimate, i.e. u2. The process then moves to block 336, where a third set of at least two images of the object are obtained. The images are the same, except for the focus position, which is different in each image. At block 336, the focus position (v) used is the focus position corresponding to u2−Δu2 for the first image, and the focus (v) corresponding to u2+Δu2 for the second image. The u2 and Δu2 referred to are the ones calculated during the previous iteration at blocks 332 and 334.

The process then advances to block 338, where u is generated from the third set of images with a depth from defocus algorithm. The process then proceeds to a return block, where other processing is resumed.

Although a particular embodiment of iterative auto-focusing is illustrated and described above with respect to FIG. 3, many variations of the embodiment shown and described are within the scope and spirit of the invention. For example, in each set of images, in the specific embodiment discussed, focus position was the parameter varied between the images. However, in some embodiments, the parameter varied may be a different camera parameter, such as zoom, rather than focus position. Alternatively, two or more of the parameters may be varied between images. Further, at the first iteration, it may be advantageous to vary the aperture size instead of the focus position, in order to avoid moving the focus motor in a possibly wrong direction. Also, in the embodiment shown in FIG. 3 and discussed with regard to FIG. 3, three iterations were performed. However, in other embodiments, only two iterations may be performed, and in other embodiments, four or more iterations may be performed.

It is preferable to perform the iterative auto-focusing with a depth-from-defocus method that is relatively stable, that is, one that provides substantially the same result when repeated. If the method used is not completely accurate with one iteration, that is acceptable, because the accuracy can be improved with repeated iterations, thus giving an accurate result after multiple iterations are performed. Since existing prior art methods of depth-from-defocus are relatively unstable, it is preferred to use a depth-from-defocus method that is more stable than prior art methods, such as those discussed in greater detail below. However, as discussed above, using the iterative auto-focusing with prior art depth-from-defocus algorithms is also within the scope and spirit of the invention.

Figure 4:
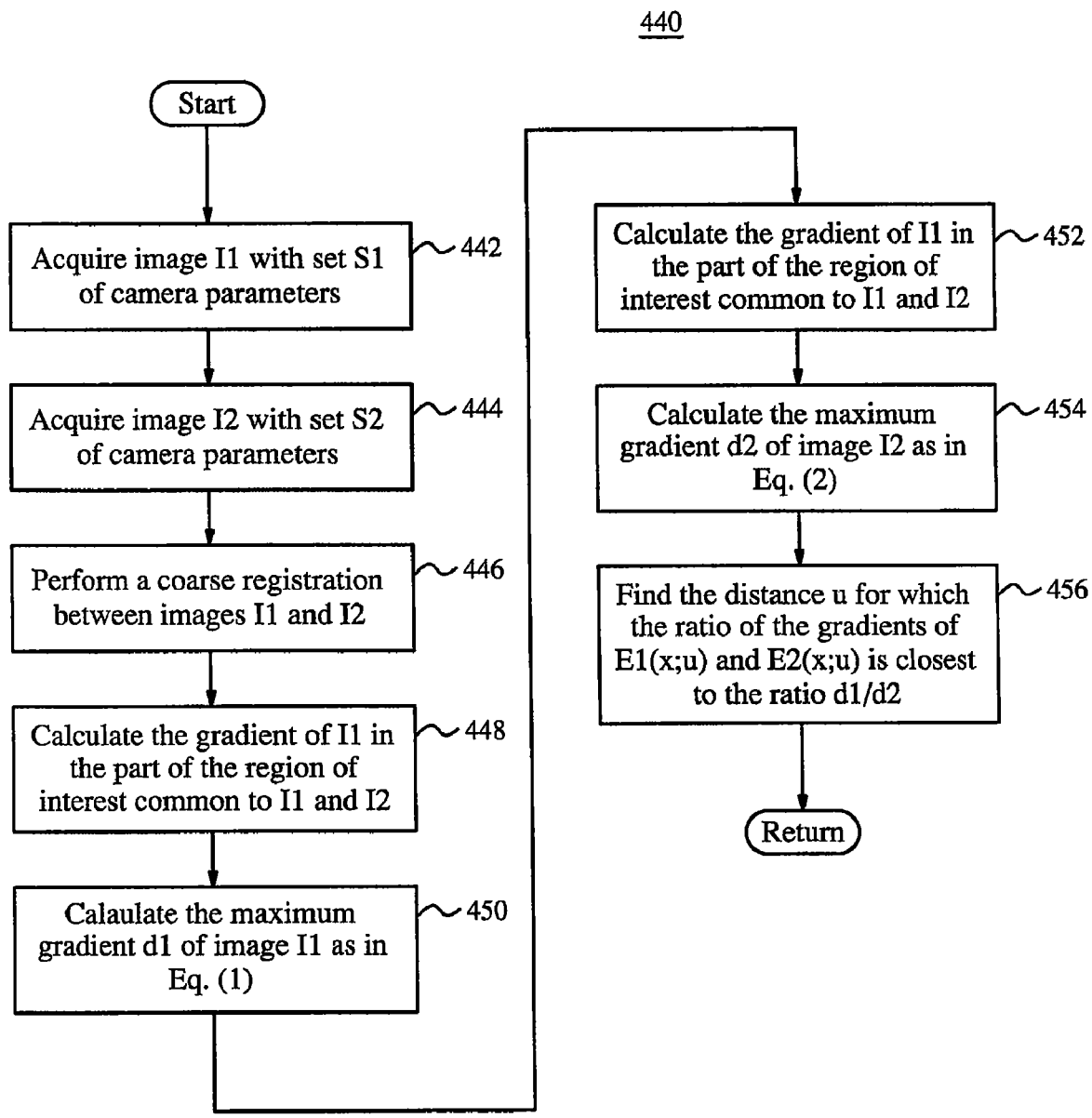
FIG. 4 illustrates a flow chart of an embodiment of a process of depth from defocus in which calculated gradients are employed.

FIG. 4 illustrates a flow chart of an embodiment of a process (440) of depth from defocus in which calculated gradients are employed. After a start block, the process moves to block 442, where an image I1 is captured with a set S1 of camera parameters. The set S1 of camera parameters may include focus position, zoom, aperture, and/or the like. The process then advances to block 444, where a second image I2 is acquired with a set S2 of camera parameters. The set of parameters S1 and S2 are not identical, but may be identical in all but one parameter, with just one parameter being varied. In other embodiments, more than one parameter may be varied between S1 and S2.

The process then proceeds to block 446, where a coarse registration is performed between images I1 and images I2. The coarse registration is performed to account for possible camera and/or scene motion. The coarse registration aligns the two images and finds the overlap region. The coarse registration does not need to be very accurate, so it can be done even though the images are blurred, for instance using scaled-down images.

The process then moves to block 448, where the gradient of the pixel values in image I1 in the part of the region of interest common to I1 and I2 is calculated. The image may be graphed three-dimensionally, as a two dimensional image with the pixel value used at the height of the image at each point in the two-dimensional image. The gradient of the image I1 is therefore the slope or grade at each point of this three-dimensional image. The process then advances to block 450, where the maximum gradient d1 of the pixel values of image I1 is calculated.

The maximum gradient is calculated as follows. In the following equations, $I_1(x, y)$, $x=0, \ldots, N_{1x}-1$, $y=0, \ldots, N_{1y}-1$, and $I_2(x, y)$, $x=0, \ldots, N_{2x}-1$, $y=0, \ldots, N_{2y}-1$ are the first and the second images after inverse gamma correction. In the calculations, a number δ much smaller than 1 (for example, $\delta=10^{-4}$) is chosen, and $d_1$ is a value such that the ratio of: the number of pixels in the first image whose absolute gradient value is greater than or equal to $d_1$, to the total number of pixels in the first image, is equal to δ:

$$\frac{\sum_{x,y} 1_{\{|\nabla I_1(x,y)| \geq d_1\}}}{N_{1x}N_{1y}} = \delta \quad (1)$$

The process then advances to block 452, where the gradient of I2 in the part of the region of interest common to I1 and I2 is calculated. The process then proceeds to block 454, where the maximum gradient d2 of image I2 is calculated, as follows. In the calculations, $d_2$ is a value such that the ratio of the number of pixels in the second image whose absolute gradient value is greater than or equal to $d_2$, to the total number of pixels in the second image, is equal to $\delta$:

$$\frac{\sum_{x,y} 1_{\{|\nabla I_2(x,y)| \geq d_2\}}}{N_{2x}N_{2y}} = \delta \quad (2)$$

The process then proceeds to block 456, where the distance u is calculated, as follows (as previously discussed, u represents the distance from the camera to the object).

In the calculation an edge profile in an ideal image may be modeled as a step function of height A smoothed by a Gaussian of width $\sigma_0$:

$$I_0(x) = \int_{-\infty}^{x} \frac{A}{\sqrt{2\pi}\,\sigma_0} \exp\left(-\frac{x'^2}{2\sigma_0^2}\right) dx'$$

In the calculations, $E_1(x; u)$ represents the edge response of the optical system when an object located at distance u from the camera is photographed with set S1 of camera parameters. In a similar way, $E_2(x; u)$ denotes the edge response of the optical system when an object located at distance u from the camera is photographed with the set S2 of camera parameters. In the calculations, $E_1(x; u)$ and $E_2(x; u)$ are also each modeled as a step function smoothed by Gaussians of widths $\sigma_1$ and $\sigma_2$:

$$E_1(x) = \int_{-\infty}^{x} \frac{1}{\sqrt{2\pi}\,\sigma_1} \exp\left(-\frac{x'^2}{2\sigma_1^2}\right) dx'$$

$$E_2(x) = \int_{-\infty}^{x} \frac{1}{\sqrt{2\pi}\,\sigma_2} \exp\left(-\frac{x'^2}{2\sigma_2^2}\right) dx'$$

The edge profiles in defocused images 1 and 2 are obtained as the convolution between the edge profile in the ideal image and the point spread function of the optical system. The point spread function of the optical system can be viewed as a filter to which the ideal image could be passed through to obtain the blurred, de-focused images. The convolution between the edge profile in the ideal image and the point spread function of the optical system is:

$$I_1(x) = I_0(x) * h_1(x)$$
$$= \int_{-\infty}^{x} \left[\frac{A}{\sqrt{2\pi}\,\sigma_0} \exp\left(-\frac{x'^2}{2\sigma_0^2}\right)\right] * \left[\frac{1}{\sqrt{2\pi}\,\sigma_1} \exp\left(-\frac{x'^2}{2\sigma_1^2}\right)\right] dx'$$
$$= \int_{-\infty}^{x} \frac{A}{\sqrt{2\pi}\,\tilde{\sigma}_1} \exp\left(-\frac{x'^2}{2\tilde{\sigma}_1^2}\right) dx'$$

$$I_2(x) = I_0(x) * h_2(x) = \int_{-\infty}^{x} \frac{A}{\sqrt{2\pi}\,\tilde{\sigma}_2} \exp\left(-\frac{x'^2}{2\tilde{\sigma}_2^2}\right) dx'$$

where widths $\tilde{\sigma}_1$ and $\tilde{\sigma}_2$ are given by $$\tilde{\sigma}_1 \sqrt{\sigma_0^2 + \sigma_1^2} \quad (3)$$

$$\tilde{\sigma}_2 \sqrt{\sigma_0^2 + \sigma_2^2} \quad (4)$$

The maximum gradients of the defocused images are therefore $$\max[\nabla I_1(x)] = \max\left[\frac{A}{\sqrt{2\pi}\,\tilde{\sigma}_1} \exp\left(-\frac{x^2}{2\tilde{\sigma}_1^2}\right)\right] = \frac{A}{\sqrt{2\pi}\,\tilde{\sigma}_1}$$

$$\max[\nabla I_2(x)] = \max\left[\frac{A}{\sqrt{2\pi}\,\tilde{\sigma}_2} \exp\left(-\frac{x^2}{2\tilde{\sigma}_2^2}\right)\right] = \frac{A}{\sqrt{2\pi}\,\tilde{\sigma}_2}$$

In the calculation of u, the distance u is found that simultaneously satisfies the following two equations:

$$\begin{cases} d_1(u) = \dfrac{A}{\sqrt{2\pi[\sigma_0^2 + \sigma_1^2(u)]}} \\ d_2(u) = \dfrac{A}{\sqrt{2\pi[\sigma_0^2 + \sigma_2^2(u)]}} \end{cases}$$

In de-focused images, due to blurring, edges of objects are blurred. The widths of these edges are therefore wider than those in the ideal image. The widths of the point spread functions forming the de-focused images are referred to as "blur widths". An edge of an image is identified based on the pixel value changing relatively quickly at the edge. An edge can be identified by high gradient values, with the edge traced in the direction of maximum change (the direction of the gradient), until the maximum/minimum value is reached on both sides of the edges. In one embodiment, the edge width is defined as the distance in pixels from 10% to 90% of the edge height in the direction of the maximum change (wherein the pixel value is the height). A comparison of the amount of blurring between the two images is used to determine the distance u. Two images are needed because the characteristics of the object in the ideal image are not known. Two ways of quantifying blur in each image are 1) the maximum gradient; and 2) the minimum edge width. The variables $\sigma_1$ and $\sigma_2$ are the widths of the point spread functions of images 1 and 2, respectively, and the variables $\tilde{\sigma}_1$ and $\tilde{\sigma}_2$ are the edge widths of images 1 and 2, respectively.

If the steepest edges in the ideal, i.e. unblurred, image are much narrower than the blur widths, then $\sigma_1, \sigma_2 \gg \sigma_0$. In this case, the algorithm is based on the fact that the ratio $d_1/d_2$ approximately follows the ratio of the gradients of $E_1(x; u)$ and $E_2(x; u)$, or in other words, the reciprocal of the ratio of the widths of $E_1(x; u)$ and $E_2(x; u)$, i.e. $\sigma_1$ and $\sigma_2$:

$$\frac{d_1(u)}{d_2(u)} = \frac{\sigma_2(u)}{\sigma_1(u)}$$

At the calibration stage, the edge responses $E_1(x; u)$ and $E_2(x; u)$ are measured or calculated for the entire range of distances u. At the focusing stage, $d_1$ and $d_2$ are extracted from the images at hand. The object's distance is then estimated as the distance u for which the ratio of the gradients of $E_1(x; u)$ and $E_2(x; u)$ is closest to the ratio $d_1/d_2$. In some cases, there are two different values of u giving the same ratio of the gradients of $E_1(x; u)$ and $E_2(x; u)$ (more than one solution to the equations). In these cases, a third image is then taken to resolve the ambiguity (to determine which of the solutions to the equations is correct).

The process then moves to a return block, where other processing is resumed.

Although a particular embodiment of the invention as shown in process 440 is discussed above, many variations are within the scope and spirit of the invention. For example, in some embodiments, in place of the gradient magnitude of the image, other derivative-like operators are used. For example, in one embodiment, the derivatives in the x- or the y-direction may be used. In addition, in some embodiments, the derivatives may be calculated on a scaled-down or a filtered version of the image.

Further, in some embodiments, the maximum gradients $d_1$ and $d_2$ may be defined in a way not exactly identical to Eqs. (1-2). A modification of the algorithm may be used which considers not only the maximum gradients, but also, for example, the average value of the gradients that are above a certain threshold.

Additionally, in some embodiments, the image can be divided into smaller regions, and the distance can be estimated for each region.

Figure 5:
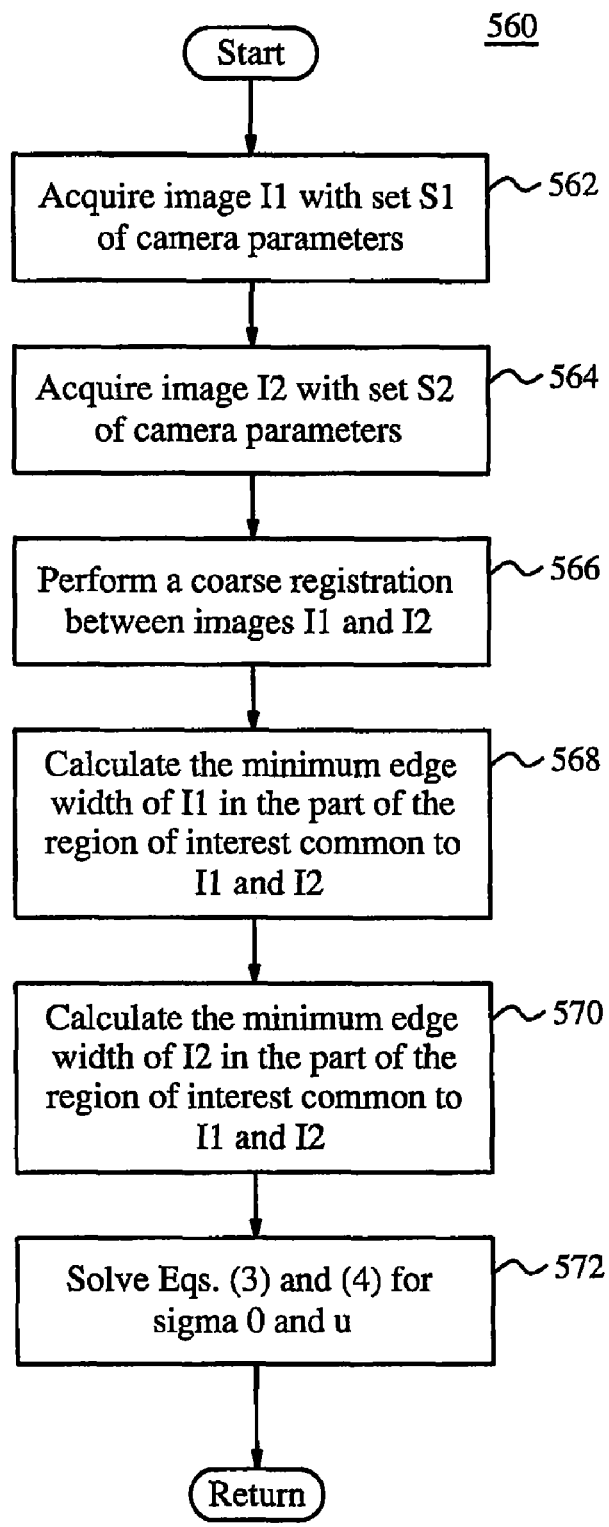
FIG. 5 shows a flow chart of an embodiment of a process of depth from defocus in which calculated edge widths are employed.

FIG. 5 shows a flow chart of an embodiment of a process (560) of depth from defocus in which calculated edge widths are employed. After a start block, the process proceeds to block 562, wherein image I1 is captured with a set S1 of camera parameters. The set S1 of camera parameters may include focus position, zoom, aperture, and/or the like. The process then advances to block 564, where an image I2 is acquired with a set S2 of camera parameters. The set of parameters S1 and S2 are not identical, but may be identical in all but one parameter, with just one parameter being varied. In other embodiments, more than one parameter may be varied between S1 and S2.

The process then proceeds to block 566, where a coarse registration is performed between images I1 and images I2. The coarse registration is performed to account for possible camera and/or scene motion. The coarse registration aligns the two images and finds the overlap region. The coarse registration does not need to be very accurate, so it can be done even though the images are blurred, for instance using scaled-down images. The process then moves to block 568, where the minimum edge width of I1 ($\tilde{\sigma}_1$) in the part of the region of interest common to I1 and I2 is calculated.

Figure 6:
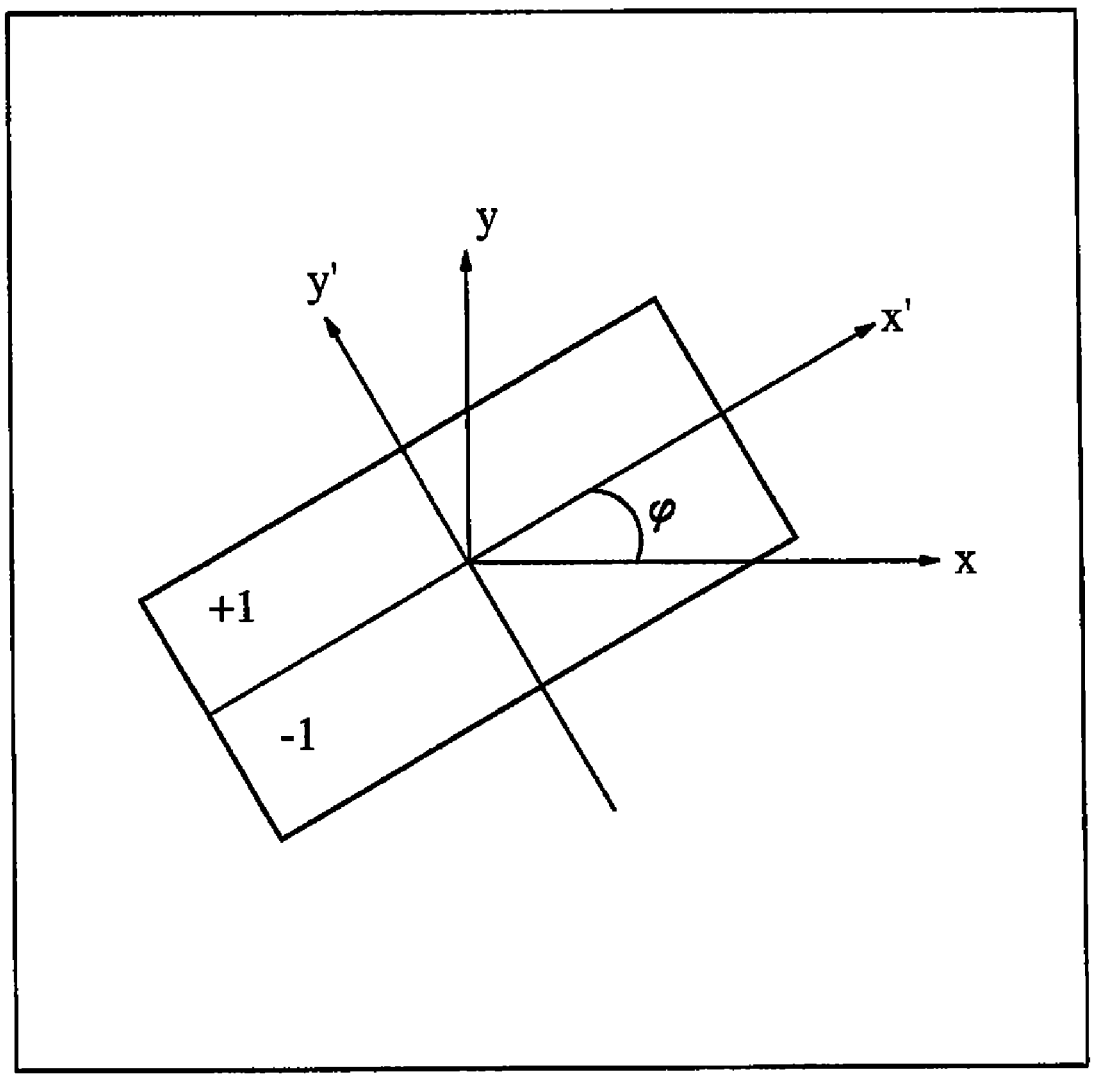
FIG. 6 illustrates a template for finding straight edges in direction φ in an embodiment of the process of FIG. 5, in accordance with aspects of the present invention.

The minimum edge width of I1 ($\tilde{\sigma}_1$) may be calculated, for example, as follows in one embodiment. At a first stage, the image is analyzed to find candidates for edges in different directions. In order to find edges in direction $\phi$, one can use, for example, the template-matching technique with the template depicted in FIG. 6. The template is a rectangle inclined at angle $\phi$ relative to the x-axis. The upper half of the template (y'>0) has the value of +1 and the lower half (y'<0) has the value of −1. The normalized cross-correlation with this template detects edges in direction $\phi$ having a step shape (i.e. flat regions on both sides of the edge). The cross-correlation is calculated between the image and the templates having different angles of inclination. The direction of the edge is taken to be the one in which the cross-correlation value is maximal. Since the image is supposed to be blurred, there is a need to downscale the image prior to searching for edges.

In this embodiment, after edge candidates have been found, the cross-section of every candidate edge is analyzed to check whether it is a single, isolated edge, so that there is as little influence as possible from other adjacent edges. Then the width of each single, isolated edge is taken note of. In one embodiment, the edge width is defined as the distance in pixels from 10% to 90% of the edge height in the direction of the maximum change. For each direction, the minimum edge width is found. Finally, under the assumption that the optical point spread function is isotropic, the minimum edge width is defined as the minimum value over all directions.

The process then advances to block 570, where the minimum edge width of I2 ($\tilde{\sigma}_2$) in the part of the region of interest common to I1 and I2 is calculated. Minimum edge width of I2 ($\tilde{\sigma}_2$) may be calculated as described above with regard to I1. The process then proceeds to block 572, where equations (3) and (4) above are solved simultaneously for $\sigma_0$ and u (in conjunction with the other equations for the values of $\sigma_1$ and $\sigma_2$)

In other embodiments, a relation even more precise than equations (3) and (4) between $\sigma_0$, $\sigma_1$, and $\sigma_2$ may be established and used in the algorithm, in order to achieve higher accuracy of the distance estimation, if the shape of the lens point spread function deviates substantially from a Gaussian.

Process 440 (of FIG. 4) and process 560 (of FIG. 5) are roughly equivalent, with the difference being whether or not $\sigma_0$ is neglected. The difference is that, in process 440, in which the maximum gradient is used, $\sigma_0$ is assumed to be negligible with regard to $\sigma_1$, and $\sigma_2$, and therefore, only one unknown, u, needs to be solved for (as previously discussed, u is the distance from the camera to the object). In process 560, $\sigma_0$ is not assumed to be negligible with regard to $\sigma_1$, and $\sigma_2$. For example, in the general case of an image without sharp edges or when the image is taken in low-light conditions, the image must be scaled down or low-pass filtered prior to applying the depth-from-defocus algorithm. In that case, $\sigma_0$ cannot be neglected compared to $\sigma_1$ and $\sigma_2$. In process 560, since $\sigma_0$ cannot be neglected compared to $\sigma_1$ and $\sigma_2$, two unknowns, u and $\sigma_0$, need to be solved for.

The maximum error of the estimation, $\Delta u$, may be calculated as follows. The distance estimation is $$u = \frac{r_1 - r_2}{r_1\left(\frac{1}{f} - \frac{1}{v_2}\right) - r_2\left(\frac{1}{f} - \frac{1}{v_1}\right)},$$

where r1 and r2 are the blur widths measured from the images, f is the focal length, v1 and v2 are the distances between the lens and the sensor at positions 1 and 2, respectively, and u is the estimate for the object's distance. The error ($\Delta u$) in u is caused by errors in r1 and r2 which can be estimated, for example, based on the noise level in the images. The error in u can be then calculated using the standard error analysis technique.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method for calculating a distance from a camera to an object, comprising acts of:
    obtaining a first image of an object employing a first set of parameters;

obtaining a second image of the object employing a second set of parameters;

determining a width of blur at corresponding edges for each of the first and second images;

generating a first estimate of the distance from the camera to the object such that the first estimate is obtained from at least the first image and the second image using depth-from-defocus based at least on an equality comparison of the width of blur determined for each of the first image and the second image;

obtaining a third image of the object employing a third set of parameters, wherein the third set of parameters are based, at least in part, on the first estimate;

obtaining a fourth image of the object employing a fourth set of parameters, wherein the fourth set of parameters are based, at least in part, on the first estimate; and determining a width of blur at corresponding edges for each of the third and fourth images;

generating a second estimate of the distance from the camera to the object such that the second estimate is obtained from at least the third image and the fourth image using depth-from-defocus based at least on an equality comparison of the width of blur determined for each of the third image and the fourth image, the calculated distance from the camera to the object being based at least in part on the second estimate.

2. The method of claim 1, wherein the first, second, third, and fourth set of parameters each include a focus position, a zoom, or an aperture.

3. The method of claim 1, further comprising acts of:

obtaining a fifth image of the object employing a fifth set of parameters, wherein the fifth set of parameters are based, at least in part, on the second estimate;

obtaining a sixth image of the object employing a sixth set of parameters, wherein the sixth set of parameters are based, at least in part, on the second estimate; and generate a third estimate of the distance from the camera to the object such that the third estimate is obtained from at least the fifth image and the sixth image using depth-from-defocus, the calculated distance from the camera to the object being based at least in part on the third estimate.

4. The method of claim 3, further comprising acts of:

calculating a maximum error for the first estimate of the distance from the camera to the object, wherein obtaining the third image is accomplished such that the third set of parameters correspond to a distance from the camera to the object of $u1-\Delta u1$, and wherein obtaining the fourth image is accomplished such that the fourth set of parameters correspond to a distance from the camera to the object of $u1+\Delta u1$, where $u1$ represents the first estimate of the distance from the camera to the object, and where $\Delta u1$ represents the calculated maximum error for the first estimate of the distance from the camera to the object; and calculating a maximum error for the second estimate of the distance from the camera to the object, wherein obtaining the fifth image is accomplished such that the fifth set of parameters correspond to a distance from the camera to the object of $u2-\Delta u2$, and wherein obtaining the sixth image is accomplished such that the sixth set of parameters correspond to a distance from the camera to the object of $u2+\Delta u2$, where $u2$ represents the second estimate of the distance from the camera to the object, and where $\Delta u2$ represents the calculated maximum error for the second estimate of the distance from the camera to the object.

5. The method of claim 3, wherein the first, second, third, fourth, fifth, and sixth set of parameters each include a focus position, and wherein performing the automatic focusing further includes:

calculating a maximum error for the first estimate of the distance from the camera to the object, wherein obtaining the third image is accomplished such that the focus position of the third set of parameters corresponds to a distance from the camera to the object of $u1-\Delta u1$, and wherein obtaining the fourth image is accomplished such that the focus position of the fourth set of parameters corresponds to a distance from the camera to the object of $u1+\Delta u1$, where $u1$ represents the first estimate of the distance from the camera to the object, and where $\Delta u1$ represents the calculated maximum error for the first estimate of the distance from the camera to the object; and calculating a maximum error for the second estimate of the distance from the camera to the object, wherein obtaining the fifth image is accomplished such that the focus position of the fifth set of parameters corresponds to a distance from the camera to the object of $u2-\Delta u2$, and wherein obtaining the sixth image is accomplished such that the focus position of the sixth set of parameters corresponds to a distance from the camera to the object of $u2+\Delta u2$, where $u2$ represents the second estimate of the distance from the camera to the object, and where $\Delta u2$ represents the calculated maximum error for the second estimate of the distance from the camera to the object.

6. The method of claim 1, wherein performing the automatic focusing further includes:

obtaining another image of the object employing another set of parameters, wherein generating the first estimate is obtained from the first image, the second image, and said another image using depth-from-defocus.

7. The method of claim 1, wherein the third set of parameters includes a first focus position, the fourth set of parameters include a second focus position, and wherein the third set of parameters are substantially identical to the fourth set of parameters except that second position is different from the first focus position.

8. The method of claim 1, wherein generating the first estimate using depth-from-defocus includes:

calculating a gradient of a portion of the first image that is common to the first and second images;

determining the maximum gradient of the portion of the first image based on the calculated gradient of the portion of the first image;

calculating a gradient of a portion of the second image that is common to the first and second images;

determining the maximum gradient of the portion of the second image based on the calculated gradient of the portion of the second image; and generating the first estimate based on the calculated maximum gradient of the portion of the first image and the calculated maximum gradient of the portion of the second image.

9. The method of claim 1, wherein generating the first estimate using depth-from-defocus includes:

calculating a minimum edge width of a portion of the first image that is common to the first and second images;

calculating a minimum edge width of a portion of the second image that is common to the first and second images; and generating the first estimate based on the calculated minimum edge width of the portion of the first image and the calculated minimum edge width of the portion of the second image.

10. A camera, comprising:
a lens that is arranged to focus light;
a sensor that is arranged to receive light and to provide images; and
a controller that is arranged to receive the image, and configured to perform actions, including:
  receiving, from the sensor, a first image of an object employing a first set of parameters;
  receiving, from the sensor, a second image of the object employing a second set of parameters;
  determining a width of blur at corresponding edges for each of the first and second images;
  generating a first estimate of a distance from the camera to the object such that the first estimate is obtained from at least the first image and the second image using depth-from-defocus based at least on an equality comparison of the width of blur determined for each of the first image and the second image;
  receiving, from the sensor, a third image of the object employing a third set of parameters, wherein the third set of parameters are based, at least in part, on the first estimate;
  receiving, from the sensor, a fourth image of the object employing a fourth set of parameters, wherein the fourth set of parameters are based, at least in part, on the first estimate; and
  determining a width of blur at corresponding edges for each of the third and fourth images;
  generating a second estimate of the distance from the camera to the object such that the second estimate is obtained from at least the third image and the fourth image using depth-from-defocus based at least on an equality comparison of the width of blur determined for each of the third image and the fourth image.

11. The method of claim 1, wherein the width of blur for the first, second, third, and fourth images are determined by at least a distance in pixels and the corresponding edges are identified based on a change of pixel values and a direction of the change at the corresponding edges.

12. The camera of claim 10, wherein the first, second, third, and fourth, set of parameters each include at least one of a focus position, an aperture, or a zoom.

13. The camera of claim 10, wherein the controller is further configured such that performing the automatic focusing further includes:
  obtaining a fifth image of the object employing a fifth set of parameters, wherein the fifth set of parameters are based, at least in part, on the second estimate;
  obtaining a sixth image of the object employing a sixth set of parameters, wherein the sixth set of parameters are based, at least in part, on the second estimate; and
  generate a third estimate of the distance from the camera to the object such that the third estimate is obtained from at least the fifth image and the sixth image using depth-from-defocus.

14. The camera of claim 10, wherein the controller is further configured such that generating the first estimate using depth-from-defocus includes:
  calculating a gradient of a portion of the first image that is common, to the first and second images;
  determining the maximum gradient of the portion of the first image based on the calculated gradient of the portion of the first image;
  calculating a gradient of a portion of the second image that is common to the first and second images;
  determining the maximum gradient of the portion of the second image based on the calculated gradient of the portion of the second image; and
  generating the first estimate based on the calculated maximum gradient of the portion of the first image and the calculated maximum gradient of the portion of the second image.

15. The camera of claim 10, wherein
the controller is further configured such that generating the first estimate using depth-from-defocus includes:
  calculating a minimum edge width of a portion of the first image that is common to the first and second images;
  calculating a minimum edge width of a portion of the second image that is common to the first and second images; and
  generating the first estimate based on the calculated minimum edge width of the portion of the first image and the calculated minimum edge width of the portion of the second image.

16. The camera of claim 10 further including at least one motor to move the lens and wherein the processor causes the motor to move the lens to auto focus the camera based at least in part on estimate calculated by the processor.

17. The camera of claim 10, wherein the width of blur for the first, second, third, and fourth images are determined by at least a distance in pixels and the corresponding edges are identified based on a change of pixel values and a direction of the change at the corresponding edges.

18. An article of manufacture including a processor-readable non-transitory medium having processor-executable code stored therein, which when executed by one or more processors, enables actions for focusing, comprising:
  calculating a distance from a camera to an object, wherein calculating the distance includes:
    obtaining a first image of an object employing a first set of parameters;
    obtaining a second image of the object employing a second set of parameters;
    determining a width of blur at corresponding edges for each of the first and second images;
    generating a first estimate of a distance from the camera to the object such that the first estimate is obtained from at least the first image and the second image using depth-from-defocus based at least on an equality comparison of the width of blur determined for each of the first image and the second image;
    obtaining a third image of the object employing a third set of parameters, wherein the third set of parameters are based, at least in part, on the first estimate;
    obtaining a fourth image of the object employing a fourth set of parameters, wherein the fourth set of parameters are based, at least in part, on the first estimate; and
    determining a width of blur at corresponding edges for each of the third and fourth images;
    generating a second estimate of the distance from the camera to the object such that the second estimate is obtained from at least the third image and the fourth image using depth-from-defocus based at least on an equality comparison of the width of blur determined for each of the third image and the fourth image.

19. The article of manufacture of claim 18, wherein the first, second, third, and fourth set of parameters each include at least one of a focus position, an aperture, or a zoom.

20. The article of manufacture of claim 18, wherein generating the first estimate using depth-from-defocus includes:
  calculating a gradient of a portion of the first image that is common to the first and second images;
  determining the maximum gradient of the portion of the first image based on the calculated gradient of the portion of the first image;
  calculating a gradient of a portion of the second image that is common to the first and second images;
  determining the maximum gradient of the portion of the second image based on the calculated gradient of the portion of the second image; and
  generating the first estimate based on the calculated maximum gradient of the portion of the first image and the calculated maximum gradient of the portion of the second image.

21. The article of manufacture of claim 18, wherein generating the first estimate using depth-from-defocus includes:
  calculating a minimum edge width of a portion of the first image that is common to the first and second images;
  calculating a minimum edge width of a portion of the second image that is common to the first and second images; and
  generating the first estimate based on the calculated minimum edge width of the portion of the first image and the calculated minimum edge width of the portion of the second image.

22. The article of manufacture of claim 18, wherein the width of blur for the first, second, third, and fourth images are determined by at least a distance in pixels and the corresponding edges are identified based on a change of pixel values and a direction of the change at the corresponding edges.

* * * * *

UNITED STATES PATENT AND TRADEMARK OFFICE
CERTIFICATE OF CORRECTION

| | |
|---|---|
| PATENT NO. | : 8,218,061 B2 |
| APPLICATION NO. | : 12/409416 |
| DATED | : July 10, 2012 |
| INVENTOR(S) | : Artemy Baxansky |

It is certified that error appears in the above-identified patent and that said Letters Patent is hereby corrected as shown below:

In column 13, line 45, in Claim 12, delete "fourth" and insert -- fourth, --, therefor.

In column 13, line 64, in Claim 14, delete "common," and insert -- common --, therefor.

Signed and Sealed this
Twenty-fifth Day of September, 2012

David J. Kappos
*Director of the United States Patent and Trademark Office*